US008571854B2

(12) United States Patent
Rambo

(10) Patent No.: US 8,571,854 B2
(45) Date of Patent: Oct. 29, 2013

(54) DETECTOR FOR USE IN VOICE COMMUNICATIONS SYSTEMS

(75) Inventor: Darwin Rambo, Surrey (CA)

(73) Assignee: Broadcom Corporation, Irvine, CA (US)

( * ) Notice: Subject to any disclaimer, the term of this patent is extended or adjusted under 35 U.S.C. 154(b) by 1339 days.

(21) Appl. No.: 12/345,407

(22) Filed: Dec. 29, 2008

(65) Prior Publication Data

US 2009/0177467 A1 Jul. 9, 2009

Related U.S. Application Data

(63) Continuation of application No. 10/688,443, filed on Oct. 17, 2003, now Pat. No. 7,472,057.

(51) Int. Cl.
*H04B 17/00* (2006.01)
*H04B 14/04* (2006.01)
*G10L 11/00* (2006.01)

(52) U.S. Cl.
USPC ............................ 704/212; 370/252; 375/224

(58) Field of Classification Search
USPC .................. 704/201, 211, 212, 213; 370/252; 375/222, 224
See application file for complete search history.

(56) References Cited

U.S. PATENT DOCUMENTS 4,661,946 A * 4/1987 Takahashi et al. ............ 370/378
4,819,253 A 4/1989 Petruschka
6,181,737 B1 * 1/2001 Okunev et al. ................ 375/222
6,195,337 B1 2/2001 Nystrom et al.
6,324,409 B1 11/2001 Shaffer et al.
6,381,266 B1 4/2002 Zhang et al.
6,560,277 B2 * 5/2003 Okunev et al. ................ 375/222
6,721,279 B1 4/2004 Zhang et al.
6,754,258 B1 6/2004 Abdelilah et al.
6,778,597 B2 8/2004 Okunev et al.
6,826,157 B1 11/2004 Davis et al.
6,985,853 B2 1/2006 Morton et al.
7,054,805 B2 5/2006 Rambo et al.
7,173,963 B2 2/2007 Zhang et al.
7,203,241 B1 4/2007 Zhang et al.
7,424,051 B2 * 9/2008 Green et al. .................. 375/222
7,472,057 B2 * 12/2008 Rambo ......................... 704/212
7,593,852 B2 * 9/2009 Gao et al. ...................... 704/233
7,865,361 B2 * 1/2011 Rambo et al. ................. 704/226
2002/0111798 A1 8/2002 Huang
2004/0042409 A1 3/2004 Hoffmann et al.
2004/0207719 A1 * 10/2004 Tervo et al. ................ 348/14.02
2004/0214551 A1 10/2004 Kim
2005/0086053 A1 * 4/2005 Rambo ......................... 704/212

OTHER PUBLICATIONS

Wikipedia, Definition of "G.711, Apr. 17, 2008, 3 pages.
Alley, "Automatic Identification of Voice Band Telephony Coding Schemes Using Neural Networks", Electronics Letters, Jun. 24, 1993, vol. 29, No. 13, pp. 1156-1157.

* cited by examiner

*Primary Examiner* — Martin Lerner
(74) *Attorney, Agent, or Firm* — Thomas Horstemeyer, LLP

(57) ABSTRACT

One or more methods and systems of detecting or identifying one or more types of algorithms used in the encoding of a voice or speech waveform is presented. The system and method may be used as a testing tool to identify whether a voice data stream is encoded using a linear G.711, μ-law G.711, or A-law G.711 algorithm. The system and method are applied to a voice data stream to ensure that a codec with the appropriate algorithm is used to reproduce an audio waveform.

41 Claims, 7 Drawing Sheets

DETECTOR FOR USE IN VOICE COMMUNICATIONS SYSTEMS

RELATED APPLICATIONS

This application is a continuation of U.S. patent application Ser. No. 10/688,443 filed Oct. 17, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Voice communication systems have incorporated many new techniques to improve speech quality. One of these techniques involves the use of pulse code modulation (PCM) of voice or speech signals. For example, the ITU-T G.711 standard may be employed to digitize and encode voice frequencies using one or more variants of PCM. Complementary codecs are utilized at the transmitter and receiver to perform such pulse code modulation (PCM).

Prior to transmission at the transmitter, many voice communication systems typically employ linear G.711, μ-law G.711, or A-law G.711 types of pulse code modulation to a speech or voice waveform. When a voice waveform is digitized by way of such pulse code modulation and transmitted by a transmitter, a receiver must appropriately decode the modulation in order to regenerate the signal transmitted from the transmitter. The received signal is typically a DS0 channel transmitting a digitized 64 kilobit/second sampled PCM signal.

Often, a newly implemented voice communication system or an existing problematic voice communication system may need to be diagnosed and tested at one or more points within the system. One of the problems that may be encountered during testing of such a communication system may relate to whether a proper PCM codec is utilized at the receiver. If the PCM codec at the receiver does not employ the corresponding decoding algorithm used by the PCM codec at the transmitter, voice quality may suffer because the received voice signal was improperly decoded.

Furthermore, the inability to efficiently diagnose codec related performance issues may lead to undue testing of other subsystems within the communication system. This often results in system downtime and additional labor costs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system to detect or identify one or more types of algorithms used in the encoding of a voice or speech waveform. The system and method may be used as a testing tool to identify whether a voice data stream was encoded using linear G.711, μ-law G.711, or A-law G.711 pulse code modulation (PCM) algorithms.

In one embodiment, a method is used to identify a type of encoding used in generating a voice data stream comprising reading words from a voice data stream, generating at least one parameter using the words and determining a format in which the words are encoded from a plurality of possible formats.

In one embodiment, a method of identifying a type of encoding used in generating a voice data stream incorporates reading words of the voice data stream, determining a first number of words of the voice data stream that corresponds to a first range of values, determining a second number of words of the voice data stream that corresponds to a second range of values, generating μ-law linear equivalents of the one or more words of the voice data stream, determining a third number of words corresponding to the μ-law linear equivalents of the one or more words that have values within a third range, determining a fourth number of words corresponding to the μ-law linear equivalents of the one or more words that have values within a fourth range, generating A-law linear equivalents of the one or more words of the voice data stream, determining a fifth number of words using corresponding to the A-law linear equivalents of the one or more words that have values within a fifth range, and determining a sixth number of words corresponding to the A-law linear equivalents of the one or more words that have values within a sixth range.

In one embodiment, a system for identifying a type of encoding used in generating a voice data stream includes a processor, a memory, a storage device, and a set of computer instructions residing in the storage media.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to detect or identify one or more types of algorithms used in the encoding of a voice or speech waveform. The system and method may be used as a testing tool to identify whether a voice data stream is encoded using one or more pulse code modulation (PCM) compression algorithms defined by ITU (International Telecommunications Union) G.711 recommendation specification. The system and method may be applied to a voice data stream comprising a number of bytes of data that has been previously stored as a data file. The one or more types of algorithms may comprise a 16 bit linear (in some instances described as uniform PCM or linear G.711), μ-law G.711, and A-law G.711 types of pulse code modulation (PCM) algorithms. The system and method characterize the voice data stream in terms of one or more parameters that correlate with linear G.711, μ-law G.711, or A-law G.711. Thereafter, the parameters are analyzed by way of one or more tests to determine which algorithm was used to encode the voice data stream.

The system and method are applied to a voice data stream in order to ensure that a codec that employs the proper decoding algorithm is used to reproduce the audio waveform that was transmitted. The system comprises a set of computer instructions or software, which resides in a computing device. The aforementioned set of computer instructions or software will be termed a G.711 detection software. The G.711 detection software may be generated using a computer language. In one embodiment, the G.711 detection software may be generated using the C/C++ language. The G.711 detection software is executed by way of the computing device. The computing device will be described, hereinafter, as a G.711 detection system. The G.711 detection software operates on a stream of data that represents an encoded speech sample. The encoded speech sample may comprise a stream of data bytes or words output by a transmit codec of a transmitter. In one embodiment, the stream of bytes may correspond to one or more utterances or one or more phrases spoken in one or more languages.

Figure 1:
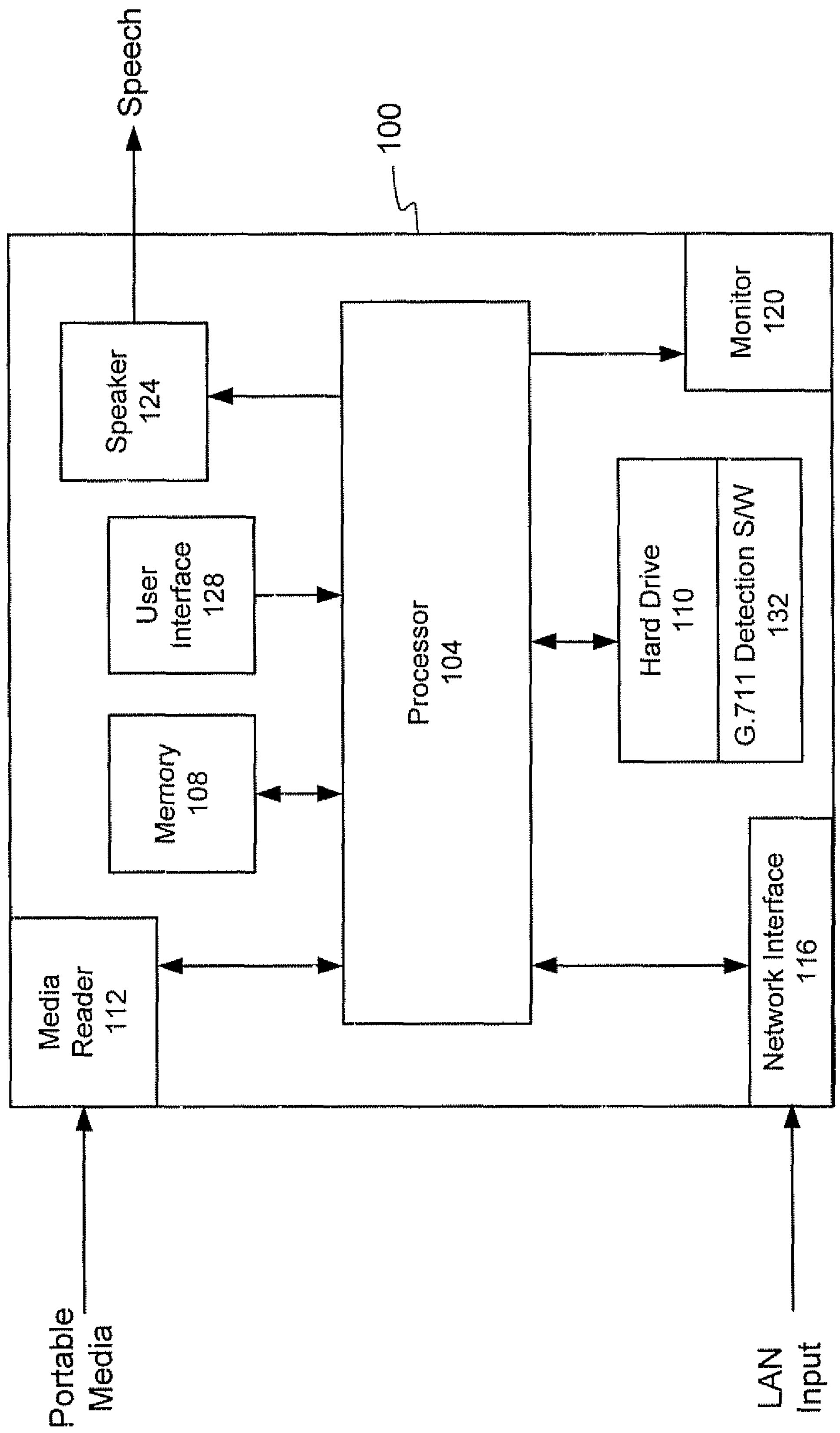
FIG. 1 is a block diagram of a G.711 detection system in accordance with an embodiment of the invention.

FIG. 1 is a block diagram of a G.711 detection system in accordance with an embodiment of the invention. The G.711 detection system 100 comprises a processor 104 connected to a memory 108, a hard drive 110, a media reader 112, a network interface 116, a monitor 120, a speaker 124, and a user interface 128. Also shown, as residing within the hard drive 110, is a G.711 detection software 132. The hard drive 110 acts as an exemplary storage device. However, the invention is not so limited, and the G.711 detection software may reside in other storage devices, such as, for example, the memory 108 or in memory internal to the processor 104. The processor 104 executes the G.711 detection software 132 to perform detection or identification of one or more voice data streams. In one embodiment, the G.711 detection software 132 may be stored and executed at a server that is communicatively coupled to the G.711 detection system 100 by way of its network interface 116. The server may store the G.711 detection software 132 until the G.711 detection software 132 is required by the G.711 detection system 100. The processor 104 may utilize its memory 108 to efficiently process and/or execute the G.711 detection software 132 residing in the hard drive 110. The memory 108 may comprise a random access memory. The voice data stream may be stored as a voice data file in the hard drive 110 or media reader 112 until it is used by the processor 104. The voice data stream file may comprise an exemplary <filename>.pcm type of data file. The <filename>.pcm file may be transmitted to the hard drive 110 from the media reader 112 or the network interface 116, as shown. The hard drive 110 may store the <filename>.pcm file when processing is performed by the processor 104. The media reader 112, may, for example, comprise a CD-ROM, floppy disk drive, magnetic drive, portable USB drive, and the like. The media reader 112 is used to read one or more portable media inserted into the media reader 112 containing the voice data stream file. The network interface 116 may allow receipt of the exemplary <filename>.pcm data file from a computing device located in a local area network (LAN). Execution of the G.711 detection software 132 may be accomplished, for example, by control provided by a user interface 128. The user interface 128 may comprise a keyboard or mouse or other input device. The monitor 120 and speaker 124 are used to provide visual and audio feedback to a user of the G.711 detection system 100. In one embodiment, the G.711 detection system 100 may comprise a workstation or a server.

Figure 2A:
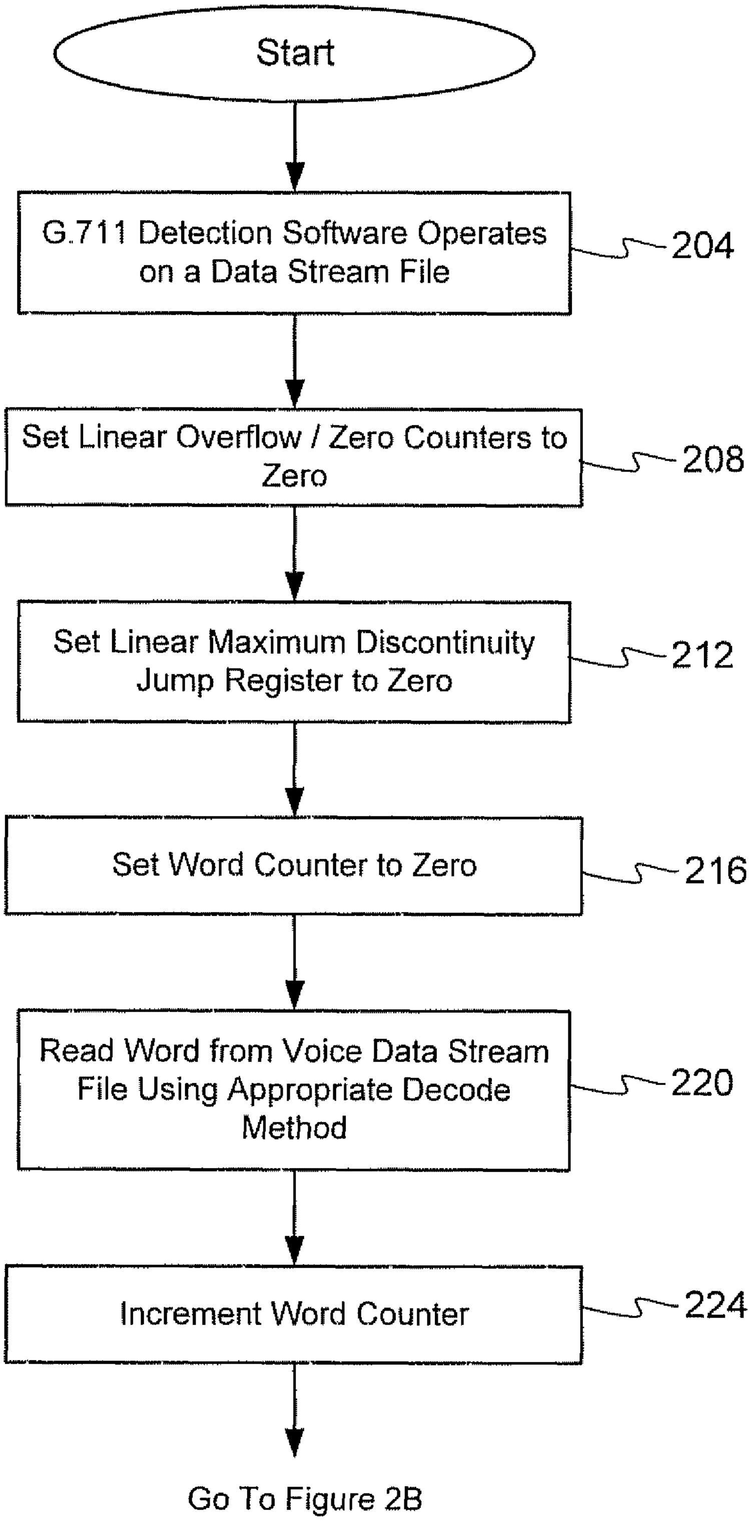
FIGS. 2A and 2B are operational flow diagrams illustrating a sequence of steps used to characterize the words in a received voice data stream in accordance with an embodiment of the invention.
Figure 2B:
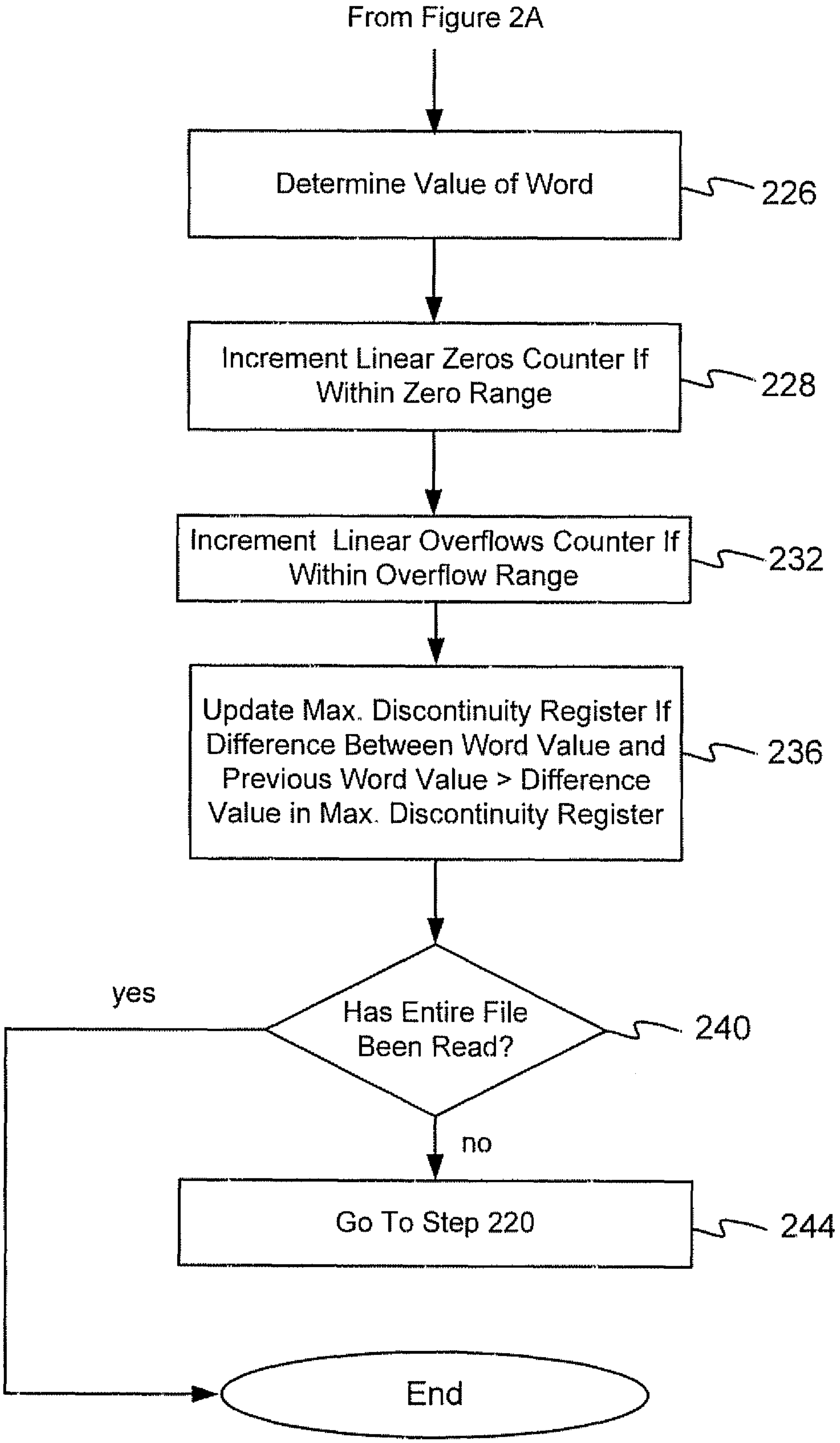

FIGS. 2A and 2B are operational flow diagrams illustrating the sequence of steps used to characterize the data words in a voice data stream as if the voice was encoded using linear G.711. FIGS. 2A and 2B are in accordance with an embodiment of the invention. The received voice data stream is assumed to be a linear G.711 (alternatively termed as a uniform PCM) data stream in reference to the sequence of steps presented in FIGS. 2A and 2B. It is contemplated that the G.711 detection system 100 may be configured to process one or more variants of linear PCM. For example, the variants may comprise either a little-endian or a big-endian type of linear PCM voice data stream.

Referring to FIG. 2A, at step 204, the G.711 detection software operates on a voice data stream. The voice data stream may comprise real time data comprising a certain number of data bytes of words. The voice data stream may comprise voice data encoded using linear G.711, μ-law G.711, or A-law G.711 algorithms. In one embodiment, the voice data stream comprises a size of 800 kilobytes, lasting approximately 100 seconds of audio runtime. At step 208, two counters are reset to zero. A first counter, termed a "linear zeros" counter, counts the number of words in the voice data stream file whose absolute value is below a first threshold value. The words that are within this first threshold value are termed "linear zeros" and correspond to words that are characteristic of a linear G.711 encoded voice data stream. A second counter, termed a "linear overflows" counter, counts the number of words in the voice data stream file whose absolute value exceeds a second threshold value. The words that exceed the second threshold are termed "linear overflows" and are non-characteristic of linear G.711. The counters may be implemented by way of addressable memory registers within the G.711 detection system previously described in FIG. 1. At step 212, a register in a memory of the G.711 detection system is reset to zero. This register is used to store a maximum value of all differences calculated between values of successive words of the entire voice data stream, and is alternatively termed a "linear maximum discontinuity jump register" (LMDJR). At step 216, a word counter that counts the number of words read is reset to zero. The word counter may be implemented by way of the addressable memory within the G.711 detection system. Next, at step 220, a word is read from the voice data stream or voice data stream file. At step 224, the word counter is incremented by one. Next, at step 226, the value of the word is determined. For example, the value of a binary sequence (0000000011111111) is determined by converting it to its decimal equivalent. In this instance, the decimal value is 255. The value may correspond to either a zero or an overflow value. At step 228, the first counter (or linear zeros counter) is incremented if the absolute value is less than or equal to the first threshold value. In one embodiment, the value may be a small number such as the exemplary decimal value 5. Next, at step 232, the second counter is incremented if the absolute value is greater than the second threshold value. In one embodiment, the second threshold value may be a large number such as the exemplary decimal value 25,000. At step 236, the LMDJR, is updated, if necessary, by calculating the difference between the value of the word currently read and the value of the word previously read. If the calculated difference is greater than what is currently stored in the LMDJR, the difference replaces the current value stored in the LMDJR. Hence, after all words in a data stream file are evaluated by the G.711 detection system, the largest difference between successive word values is stored in the LMDJR. At step 240, a decision is made as to whether the entire voice data stream has been read. If the entire voice data stream has been read, the process illustrated in FIGS. 2A and 2B ends. Otherwise, at step 244, the process reverts back to step 220 where another word is read.

Figure 3A:
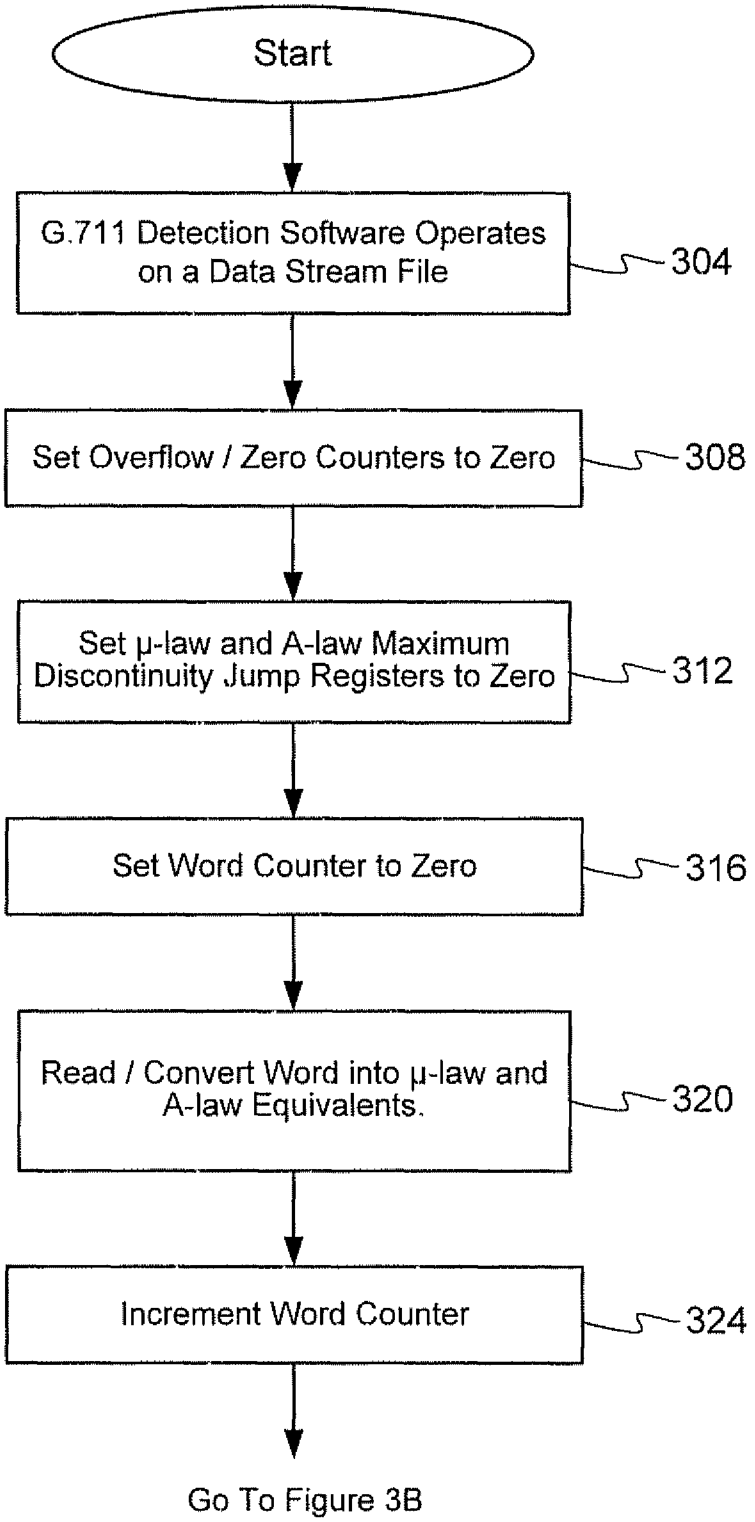
FIGS. 3A and 3B are operational flow diagrams illustrating a sequence of steps used to characterize the words in a received voice data stream in accordance with an embodiment of the invention.
Figure 3B:
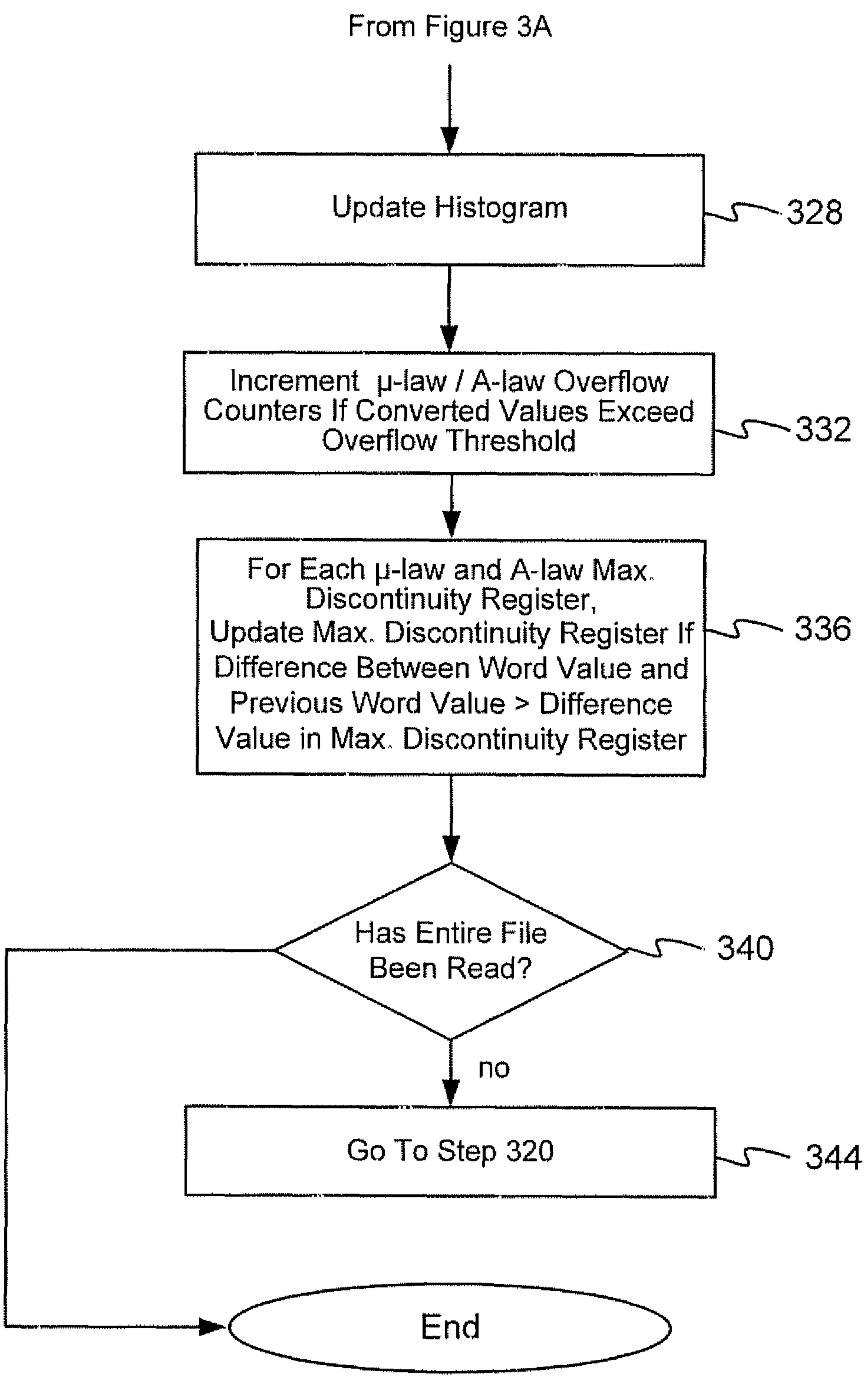

FIGS. 3A and 3B are operational flow diagrams illustrating the sequence of steps used to characterize the data words in a received voice data stream as if the voice was encoded using either μ-law G.711 or A-law G.711. FIGS. 3A and 3B are in accordance with an embodiment of the invention. The received voice data stream is assumed to be representations of either μ-law G.711 or A-law G.711 in reference to the sequence of steps represented in FIGS. 3A and 3B. In summary, the one or more methods provided by FIGS. 3A and 3B characterize the voice data stream in terms of parameters such as zeros, overflows, and maximum jump discontinuities. These parameters were described earlier in reference to FIGS. 2A and 2B, when a linear G.711 characterization of a voice data stream was performed. In the embodiment of FIGS. 3A and 3B, the values for the words or samples of the voice data stream are characterized in terms of overflows and zeros after the voice data stream is decoded or converted into its μ-law or A-law linear equivalents. The voice data stream is decoded using μ-law to linear or A-law to linear algorithms, in order to generate the appropriate μ-law linear equivalents or A-law linear equivalents. Thereafter, their respective linear equivalent values are then characterized over one or more different ranges. In the embodiment of FIGS. 3A and 3B, the equivalent values are categorized as an overflow, a zero, or a maximum jump discontinuity.

Referring to FIG. 3A, at step 304, the G.711 detection software operates on a voice data stream file. The file may comprise voice data encoded in linear G.711, μ-law G.711, or A-law G.711. The file may comprise, for example, a size of 800 kilobytes, lasting approximately 100 seconds of audio runtime. At step 308, all overflows and zeros counters are reset to zero. There are two pairs of overflows/zeros counters that are used in associating words that correspond to "zeros" or "overflows" during a μ-law to linear conversion or an A-law to linear conversion. Next at step 312, both μ-law and A-law maximum discontinuity jump registers are set to zero. As was described in FIGS. 2A and 2B, a maximum discontinuity jump register (MDJR) is used to determine the largest difference between successive linear equivalent values over the entire voice data stream or voice data stream file. Thereafter, at step 316, the word counter is set to zero. In this embodiment, each word or data sample is defined as one byte, in which one byte comprises eight binary digits. At step 320, a word from the data stream is read and converted to its μ-law and A-law linear equivalents. Next, at step 324, the word counter is incremented by one. Now referring to FIG. 3B, a histogram of hexadecimal words may be generated based on the values read. In this embodiment, the value of an exemplary 8 bit μ-law or A-law hexadecimal word corresponds to one of 256 intervals within the histogram. The number of bits used to represent an element of the histogram may be proportional to the number of data words comprising the voice data stream file. For example, 32 bits (corresponding to a maximum count of 232) may be used to sufficiently represent an 800 kilobyte (or in this instance an 800 kiloword) voice data stream file. The 256 different hexadecimal values implement 256 x-axis intervals in an exemplary histogram, while the frequency of occurrence of a particular value is indicated on the y-axis of the histogram by way of the 32-bit counter. Hence, at step 328, the appropriate intervals in the histogram are updated in terms of their occurrence. At step 332, the corresponding μ-law or A-law overflows counters are incremented if the word values exceed their respective thresholds. Optionally, the corresponding μ-law or A-law zeros counters may be incremented if the linear equivalents are below their respective thresholds. Alternatively, the number of words with linear equivalents corresponding to overflows or zeros values may be determined by summing portions of the histogram corresponding to their appropriate m-law or A-law linear equivalents (as will be described in FIG. 4 with respect to the calculation of the number of zeros). Next at step 336, the μ-law DJR, is updated, if necessary, by calculating the difference between the μ-law linear equivalent value of the word currently read and the μ-law linear equivalent value of the word previously read. If this difference is greater than what is currently stored in the μ-law DJR, the difference is used to replace the value currently stored in the μ-law MDJR. Hence, after all words in a voice data stream are evaluated by the G.711 detection system, the largest difference between successive word values is stored in the μ-law MDJR. Similarly, the A-law MDJR, is updated, if necessary, by calculating the difference between the A-law linear equivalent value of the word currently read and the A-law linear equivalent value of the word previously read. At step 340, the process ends if the entire voice data stream has been read. Otherwise the process advances to step 344. At this step, the process reverts back to step 320, allowing another word to be read from the voice data stream.

Figure 4:
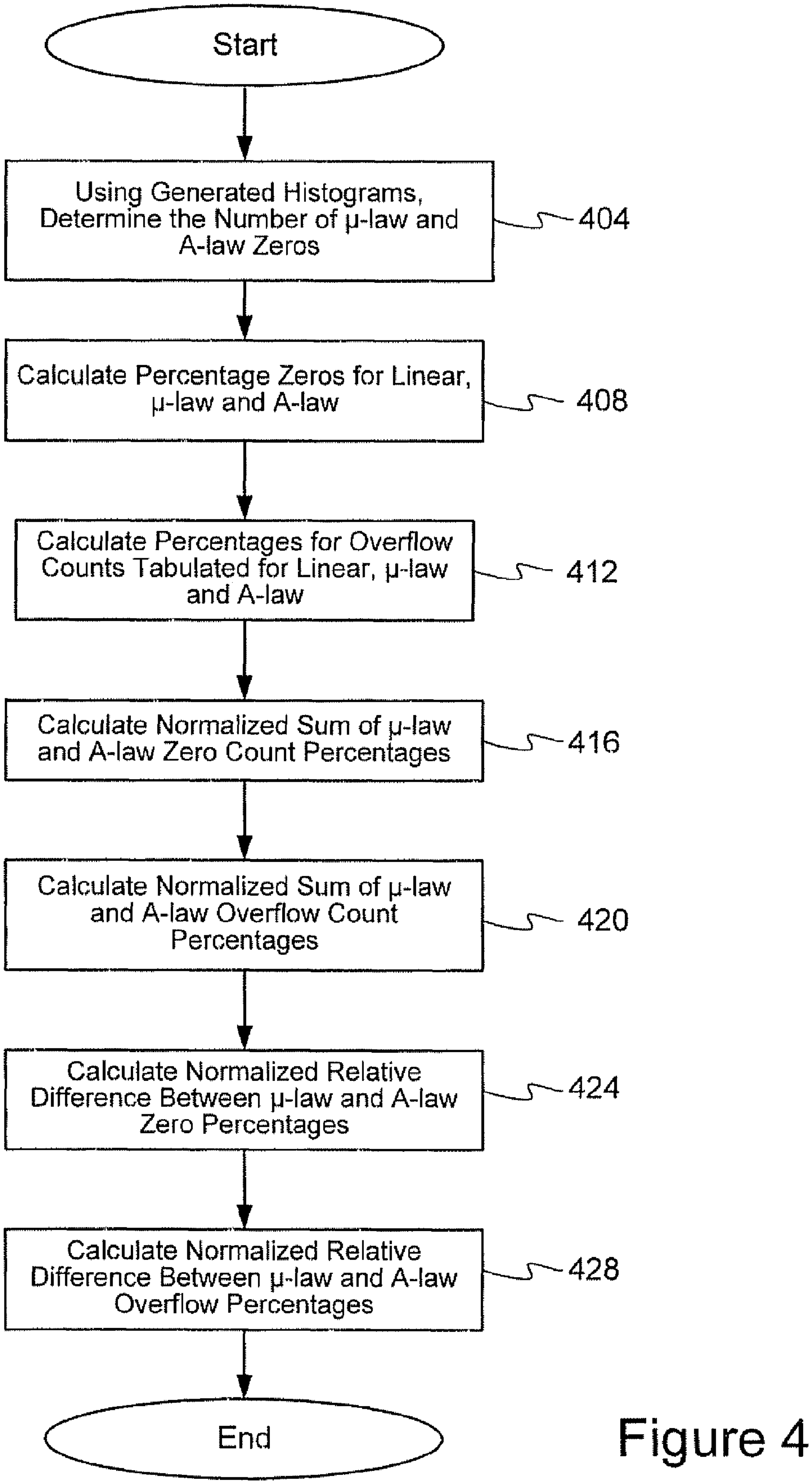
FIG. 4 is an operational flow diagram illustrating a calculation of a number of parameters that are used in determining the type of G.711 encoding represented by the voice data stream file in accordance with an embodiment of the invention.

FIG. 4 is an operational flow diagram illustrating the calculation of a number of parameters which are used in determining the type of G.711 encoding represented by the voice data stream file. At step 404, μ-law or A-law words whose linear equivalents correspond to "zeros" (termed μ-law or A-law zeros, hereinafter) may be determined by identifying the corresponding intervals in the histogram. For example, the hexadecimal values—0x7f, 0xff, 0x7e, and 0xfe may be identified as one or more intervals in the histogram that correspond to μ-law zeros. Adding the occurrences represented by these law zero" intervals yields the total number of μ-law words in the voice data stream that correspond to "μ-law zeros". Likewise, the hexadecimal values—0x55, 0x5, 0x54, and 0xd4 may be used to identify appropriate intervals in the histogram corresponding to A-law zeros. Adding the occurrences represented by these "A-law zero" intervals yields the number of A-law words in the voice data stream that correspond to "A-law zeros". Although previously described and implemented in FIGS. 3A and 3B using counters, it is contemplated that μ-law or A-law words whose linear equivalents correspond to "overflows" (termed μ-law or A-law overflows, hereinafter) may be determined by identifying the appropriate intervals in the histogram and summing the occurrences. Next, at step 408, the corresponding percentages are calculated for linear G.711, μ-law G.711 and A-law G.711 zeros. For example, the percentage of linear zeros is calculated by dividing the number of "linear zeros" by the total number of words in the data stream file and then multiplying by 100. Likewise, the percentage of μ-law G.711 zeros is calculated in a similar fashion. Similarly, the percentage of A-law G.711 zeros is calculated. Next, at step 412, the percentages are calculated for the number of linear G.711, μ-law G.711, and A-law G.711 overflows determined previously.

Thereafter, at step 416, the normalized sum of μ-law and A-law "zeros" are calculated using the following equation:

$$zero\_mag=(a zero\_percent+\mu zero\_percent)/100.0,$$

wherein zero_mag is defined as the normalized sum of μ-law and A-law zeros;

azero_percent is defined as the percentage of words at A-law zero levels (whose absolute value is below a threshold), and μzero_percent is defined as the percentage of words at μ-law zero levels (whose absolute value is above a threshold).

Next, at step 420, the normalized sum of μ-law and A-law "overflows" are calculated using the following equation:

$$ovfl\_mag=(aovfl\_percent+movfl\_percent)/100.0,$$
wherein ovfl_mag is defined as the normalized sum of μ-law and A-law overflows;

aovfl_percent is defined as the percentage of words at A-law overflow levels (whose absolute value is above a threshold); and μovfl_percent is defined as the percentage of words at μ-law overflow levels (whose absolute value is below a threshold).

Thereafter, at step 424, the normalized difference between μ-law and A-law "zeros" are calculated, using the following exemplary equation:

$$zero\_diff=(abs(azero\_percent-\mu zero\_percent)/(azero\_percent+\mu zero\_percent+0.001)),$$ wherein zero_diff is defined as the normalized difference between μ-law and alaw zeros;

μzero_percent is defined as the percentage of words at μ-law zero levels (as was previously described); and azero_percent is defined as the percentage of words at A-law zero levels (as was previously described).

The value 0.001 is added in the denominator as a safeguard to prevent an instance in which the denominator in the quotient is equal to zero. In such an event, the quotient is equal to infinity and the value of ovfl_diff may not be acceptable.

At the last step 428, of FIG. 4, the normalized sums of μ-law and A-law "overflows" are calculated using the following equation:

$$ovfl\_diff=(abs(\mu ovfl\_percent-aovfl\_percent)/(\mu ovfl\_percent+aovfl\_percent+0.001)),$$ wherein, ovfl_diff is defined as the normalized difference between μ-law and A-law overflows;

μovfl_percent is defined as the percentage of words at μ-law overflow levels; and aovfl_percent is defined as the percentage of words at A-law overflow levels.

After the parameters described in FIG. 4 are calculated, a series of tests are successively performed during execution of the G.711 detection software to determine whether the voice data stream words represents a linear G.711, a μ-law G.711, or an A-law G.711 representation.

Figure 5:
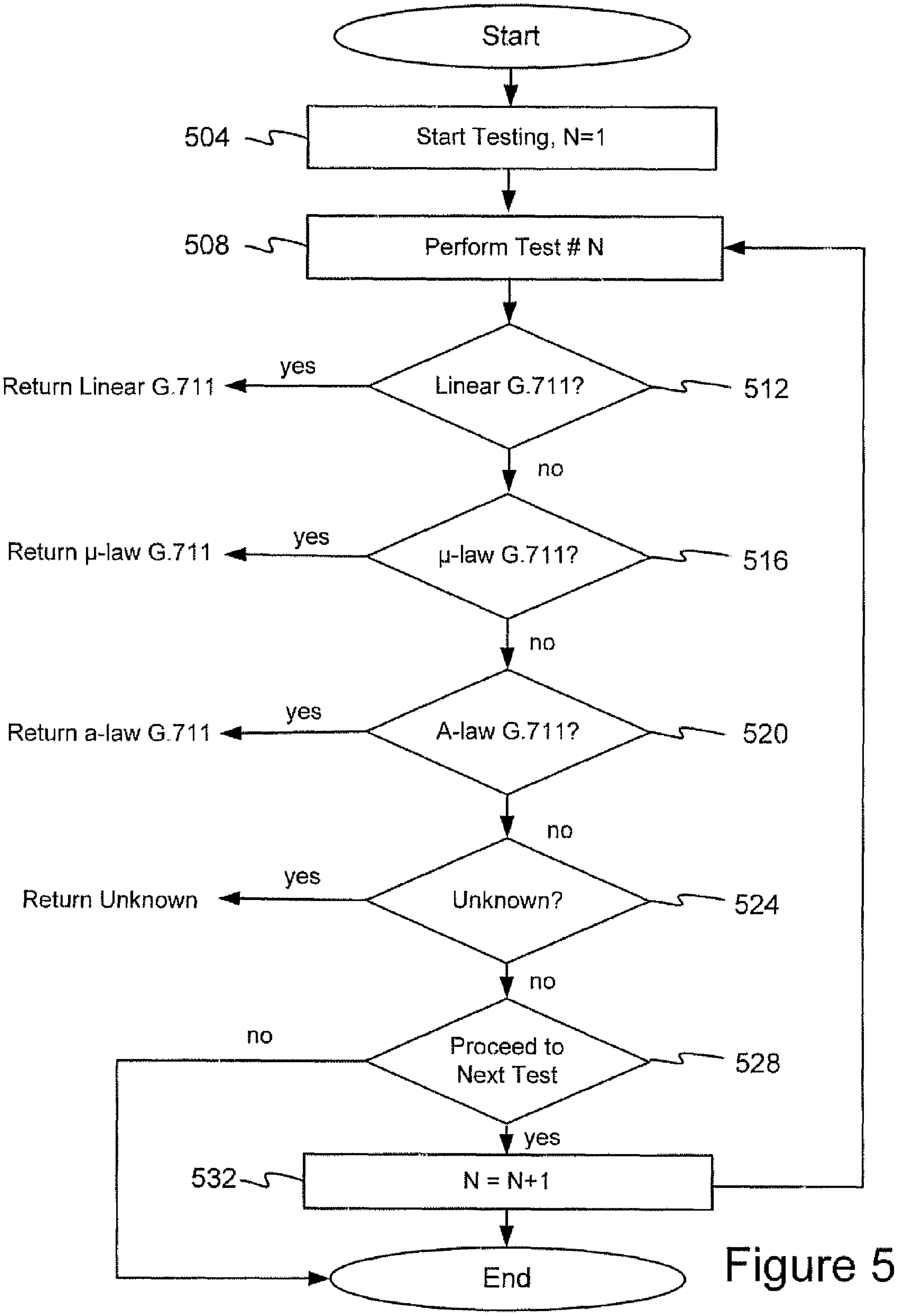
FIG. 5 is an operational flow diagram illustrating a sequence of N tests performed on a voice data stream file.

FIG. 5 is an operational flow diagram illustrating a sequence of N tests performed on a voice data stream file. The tests are applied successively in order to determine if the voice data stream file under test by the G.711 detection system is in fact, a representation of linear G.711, μ-law G.711, A-law G.711, or an unknown data stream based on the criterion or parameters used by the G.711 detection software within the G.711 detection system. The number of tests performed by the G.711 detection system may vary based on the characteristics of the voice data stream file. In the following embodiment, a maximum of ten tests may be performed in succession. The tests are performed successively until a test determines an outcome. If a test results in no outcome, the next test is performed until an outcome is generated or until the last test is performed. The variables/constants used in the following exemplary tests are defined as follows:

μ_maxjump is defined as the maximum μ-law jump discontinuity;

a_maxjump is defined as the maximum A-law jump discontinuity;

l_maxjump is defined as the maximum linear jump discontinuity;

lovfl_percent is defined as the percentage of words at linear overflow levels;

povfl_percent is defined as the percentage of words at μ-law overflow levels;

aovfl_percent is defined as the percentage of words at A-law overflow levels;

ovfl_mag is defined as the normalized sum of μ-law and A-law overflows;

uzero_percent is defined as the percentage of words at ulaw zero levels;

azero_percent is defined as the percentage of words at alaw zero levels;

lzero_percent is defined as the percentage of words at linear zero levels;

JUMP_MAX=40000 (Threshold for max jump for any sample to sample);

JUMP_DIFF=20000 (Threshold for linear/μ-law/A-law max jump differences);

THR_LIN_OVFL_PERCENT=0.01 (linear overflows below this % threshold are significant);

THR_UA_OVFL_PERCENT=0.5 (μ-law/A-law overflows above this % threshold are significant);

THR_LIN_ZERO_PERCENT=50 (linear zeros above this % threshold are significant);

THR_OVFL_DIFF=0.25 (overflow difference threshold);

THR_OVFL_MAG=0.02 (overflow magnitude threshold)

THR_ZERO_DIFF=0.75 ((μ-law to A-law zero difference threshold)

THR_ZERO_MAG=0.10 (zero magnitude threshold).

Referring to FIG. 5, at step 504, the G.711 detection software initiates the start of a new testing sequence by setting N=1. The variable N is an indicator of which test is being executed by the G.711 detection software. At step 508, the first test (N=1, Test #1) is performed. During the course of the first test, a number of decisions are made by the first test based on one or more parameters calculated previously. For example, at step 512, the first test may determine whether the voice data stream file being tested represents linear G.711 file. If the test determines that the voice data stream is linear G.711, it returns an appropriate message such as "Return Linear G.711". At step 516, the first test may determine whether the voice data stream file represents μ-law G.711 file. If the test determines that the voice data stream is μ-law G.711, it returns an appropriate message. At step 520, the first test may determine whether the voice data stream represents an A-law G.711 file. Next, at step 524, the first test may determine that the voice data stream is not characteristic of linear, μ-law, or A-law G.711. As a consequence, the first test may generate an "unknown" response. Otherwise, at step 528, the process proceeds to the next test. At step 532, N is incremented by one, so N=2, and the testing process reverts to step 508 with the second test being performed. Similarly, the testing process continues until a decision is made by a test or until the last test is completed. The following ten tests may be performed sequentially to determine the type of G.711 represented by a voice data stream file. The embodiments provided by the following ten tests are exemplary, and it is contemplated that other similar tests may be implemented using the parameters previously determined in FIG. 2 through FIG. 5.

The first test determines if both a μ-law maximum jump discontinuity and an A-law maximum jump discontinuity are greater than a first threshold. In addition, the test determines if a difference between the μ-law maximum jump discontinuity and a linear maximum jump discontinuity is greater than a second threshold. Furthermore, the test determines if a difference between an A-law maximum jump discontinuity and the linear maximum jump discontinuity is greater than the second threshold. Then, the first test verifies if a normalized sum of μ-law and A-law "overflows" is above a third threshold, a percentage of linear overflows is less than a fourth threshold, a percentage of μ-law overflows is greater than a fifth threshold, and a percentage of A-law overflows is greater than the fifth threshold. If all these conditions are satisfied, the G.711 detection software determines that the voice data stream file is linear G.711. For example, a software program such as a C/C++ program may comprise the following high level language instructions to implement this particular test, in which exemplary threshold values for JUMP_MAX, JUMP_DIFF, THR_LIN_OVFL_PERCENT, THR_OVFL_MAG, THR_UA_OVFL_PERCENT, and THR_UA_OVFL_PERCENT were defined previously.

```
if ((μ_maxjump > JUMP_MAX) && (a_maxjump > JUMP_MAX)
&& ((μ_maxjump – 1_maxjump) > JUMP_DIFF)
&& ((a_maxjump – 1_maxjump) > JUMP_DIFF))
  {
    if ((lovfl_percent < THR_LIN_OVFL_PERCENT) && (ovfl_mag >
    THR_OVFL_MAG)
    && (uovfl_percent > THR_UA_OVFL_PERCENT) &&
    (aovfl_percent > THR_UA_OVFL_PERCENT))
    {
    return RC_LINEAR;
  }
}
```

The second test determines if a percentage of linear zeros is above a particular threshold and if a percentage of μ-law zeros and if a percentage of A-law zeros are both below the same threshold. If all these conditions are satisfied, the G.711 detection software determines that the voice data stream is linear G.711. For example, a software program such as a C/C++ program may comprise the following high level language instructions to implement this particular test:

```
if ((lzero_percent > THR_LIN_ZERO_PERCENT)
  && (azero_percent < THR_LIN_ZERO_PERCENT)
  && (uzero_percent < THR_LIN_ZERO_PERCENT))
{
  return RC_LINEAR;
}
```

The third test determines whether μ-law or A-law was used to encode the voice data stream file. The test determines if the μ-law and A-law zeros and overflows percentages are significantly different. For example, the G.711 detection system calculates whether a normalized difference between the μ-law and A-law overflows is greater than a normalized overflows difference threshold and a normalized difference between the μ-law and A-law zeros is greater than a normalized zeros difference threshold. If the μ-law/A-law zeros and overflows are significantly different, the G.711 detection system determines if the number of μ-law overflows is greater than the number of A-law overflows and the A-law zero percentage is greater than the μ-law zero percentage. If so, then the G.711 detection system determines that the voice data stream file is A-law G.711. If not, the G.711 detection system determines whether the number of A-law overflows is greater than μ-law overflows and that percentage of μ-law zeros is greater than the percentage of A-law zeros. If so, then the G.711 detection system determines that the voice data stream file is μ-law G.711. For example, a software program such as a C/C++ program may comprise the following high level language instructions to implement this particular test:

```
if ((ovfl_diff > THR_OVFL_DIFF) && (zero_diff >
THR_ZERO_DIFF))
  {
    if ((u_overflows > a_overflows) &&
(azero_percent > uzero_percent))
    {
      return RC_ALAW;
    }
    else if ((a_overflows > u_overflows) &&
(uzero_percent > azero_percent))
    {
      return RC_ULAW;
    }
  }
```

The fourth test checks to see if there are no μ-law or A-law overflows before using μ-law or A-law zeros percentages to determine an outcome. Then, the test determines if an A-law zeros percentage is greater than a μ-law zeros percentage. If so, the test returns an A-law G.711 decision. If the test subsequently determines if the μ-law zeros percentage is greater than the A-law zeros percentage, a μ-law G.711 decision is returned. If either μ-law or A-law G.711 decision is not determined, the fourth test returns "unknown" as a decision. For example, a software program such as a C/C++ program may comprise the following high level language instructions to implement this particular test:

```
if (!a_overflows && !u_overflows) /* No overflows or underflows */
  {
   int rc = zeroCheck(azero_percent, uzero_percent);
   if (rc != RC_UNKNOWN)
     return rc;
```

wherein a helper function is invoked to determine zeroCheck as shown below:

```
int zeroCheck(double azero_percent, double uzero_percent)
{
  if (azero_percent > uzero_percent)
  {
    return RC_ALAW;
  }
  if (uzero_percent > azero_percent)
  {
    return RC_ULAW;
  }
  return RC_UNKNOWN;
}
```

The fifth test determines if a normalized sum of the μ-law and A-law zeros is greater than a first threshold. The test subsequently determines if a normalized difference of the A-law and μ-law zeros is greater than a second threshold. In addition to this condition, a normalized sum of the μ-law and A-law overflows and a normalized difference between the μ-law and A-law overflows must both be less than a third threshold and fourth threshold, respectively. If all of the previously described conditions are satisfied, the G.711 detection system invokes the zeroCheck helper function previously described in the fourth test to determine whether μ-law zeros percentage or A-law zeros percentage is greater. The fifth test returns a decision based on this helper function. For example, a software program such as a C/C++ program may comprise the following high level language instructions to implement this particular test:

```
if ((zero_mag > THR_ZERO_MAG) && (zero_diff >
THR_ZERO_DIFF)) /* zeros significant */
 {
  if ((ovfl_mag < THR_OVFL_MAG) && (ovfl_diff <
THR_OVFL_DIFF)) /* overflows insignificant */
  {
   int rc = zeroCheck(azero_percent, uzero_percent);
   if (rc != RC_UNKNOWN) return rc;
  }
 }
```

The sixth test assesses whether a normalized sum of the μ-law and A-law overflows is greater than a first threshold and if a normalized difference of the μ-law and A-law overflows is greater than a second threshold. If these two conditions are satisfied, then an assessment is made if a normalized difference between the μ-law and A-law zeros is less than a third threshold. If the third condition is satisfied, the G.711 detection system invokes an overflowCheck helper function to determine whether the μ-law overflows percentage or the A-law overflows percentage is greater. The sixth test returns a decision based on this helper function. For example, a software program such as a C/C++ program may comprise the following high level language instructions to implement this particular test:

```
 if ((ovfl_mag > THR_OVFL_MAG) && (ovfl_diff >
THR_OVFL_DIFF)) /* ovflow significant */
 {
  if (zero_diff < THR_ZERO_DIFF) /* zeros insignificant */
  {
   int rc = ovflCheck(aovfl_percent, uovfl_percent);
   if (rc != RC_UNKNOWN) return rc;
  }
 }
```

wherein a helper function is invoked to determine ovflCheck as shown below:

```
{
 if (aovfl_percent > uovfl_percent)
 {
  return RC_ULAW;
 }
 if (uovfl_percent > aovfl_percent)
 {
  return RC_ALAW;
 }
 return RC_UNKNOWN;
}
```

The seventh test assesses if a normalized sum of the μ-law and A-law zeros is greater than a first threshold and a normalized differences of the μ-law and A-law zeros is greater than a second threshold. If so, the G.711 detection system invokes the zeroCheck helper function previously described in the fourth test to determine whether μ-law zeros percentage or A-law zeros percentage is greater. The seventh test returns a decision based on this helper function. For example, a software program such as a C/C++ program may comprise the following high level language instructions to implement this particular test:

```
if ((zero_mag > THR_ZERO_MAG) && (zero_diff >
THR_ZERO_DIFF))
{
 int rc = zeroCheck(azero_percent, uzero_percent);
 if (rc != RC_UNKNOWN) return rc;
}
```

The eighth test assesses whether a normalized sum of the μ-law and A-law overflows is greater than a first threshold and whether a normalized difference of the μ-law and A-law overflows are greater than a second threshold. If both are significant, the detection system invokes the overflowCheck helper function, as was previously described, to determine whether the μ-law overflows percentage or the A-law overflows percentage is greater. The eighth test returns a decision based on this helper function. For example, a software program such as a C/C++ program may comprise the following high level language instructions to implement this particular test:

```
 if ((ovfl_mag > THR_OVFL_MAG) && (ovfl_diff >
THR_OVFL_DIFF))
{
 int rc = ovflCheck(aovfl_percent, uovfl_percent);
 if (rc != RC_UNKNOWN) return rc;
}
```

The ninth test assesses whether an A-law maximum discontinuity jump is greater than a first threshold and whether an absolute value of the difference between the A-law maximum discontinuity jump and a μ-law maximum discontinuity jump is greater than a second threshold. If both of these last two conditions are satisfied, then the G.711 detection system generates a μ-law decision. Otherwise, the G.711 detection system assesses whether the μ-law maximum discontinuity jump is greater than the first threshold and whether the absolute value of the difference between the A-law maximum discontinuity jump and the μ-law maximum discontinuity jump is greater than the second threshold. If both of these last two conditions are satisfied, then the G.711 detection system generates an A-law decision. For example, a software program such as a C/C++ program may comprise the following high level language instructions to implement this particular test:

```
  if ((a_maxjump > JUMP_MAX) && fabs(a_maxjump –
u_maxjump) > JUMP_DIFF)
  {
   return RC_ULAW;
  }
  if ((u_maxjump > JUMP_MAX) && fabs(a_maxjump –
u_maxjump) > JUMP_DIFF)
  {
   return RC_ALAW;
  }
```

The tenth test is a combination of two subtests. The first subtest compares the normalized difference between μ-law and A-law overflows against two parameters. If the normalized difference between μ-law and A-law overflows is greater than twice the normalized difference between μ-law and A-law zeros while the normalized difference between μ-law and A-law overflows is greater than a first threshold, then the G.711 detection system invokes the ovflCheck helper function previously described to determine whether the μ-law overflows percentage or the A-law overflows percentage is greater. The second subtest compares a normalized difference between μ-law and A-law zeros versus twice a normalized difference between μ-law and A-law overflows while assessing the normalized difference between μ-law and A-law zeros against a second threshold. If the normalized difference between μ-law and A-law zeros is greater than twice the normalized difference between μ-law and A-law overflows while the normalized difference between μ-law and A-law zeros is greater than a second threshold, then the G.711 detection system invokes the zeroCheck helper function previously described to determine whether the μ-law zeros percentage or the A-law zeros percentage is greater.

```
{
  int rc = ovflCheck(aovfl_percent, uovfl_percent);
  if (rc != RC_UNKNOWN) return rc;
}
if ((zero_diff > (2 * ovfl_diff)) && (zero_diff > THR_ZERO_DIFF))
{
  int rc = zeroCheck(azero_percent, uzero_percent);
  if (rc != RC_UNKNOWN) return rc;
}
```

The following computer output is generated by an exemplary G.711 detection system that executes the exemplary G.711 detection software. The G.711 detection software operates on an exemplary file named ingress.pcm:

```
Processing iodump_raw2096_Called_bos_ingress.pcm . . .
bytes=1148400
words=574160
u_overflows=17627
a_overflows=0
lin_overflows=16734
threshold=+/-25000
alaw maxjump=11776
ulaw maxjump=64248
lin maxjump=64136
alaw zeros=93.69%
ulaw zeros=0.04%
lin zeros=0.03%
alaw overflows=0.00%
ulaw overflows=1.53%
lin overflows=2.91%
overflow magnitude (0-1)=0.02
zero magnitude (0-1)=0.94
overflow difference (0-1)=1.00
zero difference (0-1)=1.00
ingress.pcm is ALAW
```

As illustrated by the preceding output, the samples or words in the voice data stream file are characterized by a substantial number of A-law zeros. The values of these words, after converting from A-law to linear are analyzed and those words that exceed a particular threshold value are categorized as overflows while those that fall below a particular threshold are classified as zeros. In this particular data stream file, the percentage of A-law zeros far exceeds the percentage of μ-law zeros or linear zeros. Referring to the output above, the percentage of A-law zeros is 93.69% while the μ-law and linear zeros are negligible. Another parameter of significance is the maximum discontinuity jump associated with values of successive words in either the linear, A-law, or μ-law case. As illustrated in the output, the maximum discontinuity jump associated with the A-law case is the smallest among the three possible cases. The maximum discontinuity jump associated with A-law is 11,766 compared with approximately 64,000 for the other two cases, indicating that a voice data stream decoded using A-law G.711 results in values that are more reasonable than the same voice data stream decoded using either μ-law G.711 or linear G.711. Hence, as illustrated by the last line of the output, the data stream file has been determined to be encoded using A-law (i.e., the data file is a representation of A-law).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:

generating, using at least one processor, at least one parameter using a plurality of words of a received voice data stream, wherein said at least one parameter comprises:

a maximum value of a plurality of difference values calculated between a plurality of successive words of said plurality of words of said voice data stream; and a quantity of said plurality of words that represent a particular value that is within a value range, said quantity indicating a frequency of occurrence of said particular value; and determining, using the at least one processor and based on said at least one parameter, a type of encoding used in generating said voice data stream.

2. The method of claim 1 wherein said type of encoding comprises a linear G.711 encoding, a μ-law G.711 encoding, or an A-law G.711 encoding.

3. The method of claim 1 wherein said value range comprises a subset of said difference values having an absolute value less than or equal to a threshold.

4. The method of claim 3 wherein said threshold equals the value 5.

5. The method of claim 1 wherein said value range comprises a subset of said difference values having an absolute value greater than a threshold.

6. The method of claim 5 wherein said threshold equals the value 25,000.

7. The method of claim 1 wherein said at least one parameter comprises a second quantity of said words of said voice data stream having a plurality of μ-law linear equivalents corresponding to said value range.

8. The method of claim 7 wherein said value range comprises a subset of said difference values having an absolute value less than or equal to a threshold.

9. The method of claim 8 wherein said threshold equals the value 5.

10. The method of claim 7 wherein said value range comprises a subset of said values having an absolute value greater than a threshold.

11. The method of claim 10 wherein said threshold equals the value 25,000.

12. The method of claim 1 wherein said at least one parameter comprises a second quantity of said words of said voice data stream having a plurality of A-law linear equivalents corresponding to said value range.

13. The method of claim 12 wherein said value range comprises a subset of said difference values having an absolute value less than or equal to a threshold.

14. The method of claim 13 wherein said threshold equals the value 5.

15. The method of claim 12 wherein said value range comprises a subset of said difference values having an absolute value greater than a threshold.

16. The method of claim 15 wherein said threshold equals the value 25,000.

17. The method of claim 1 wherein said difference values comprise a plurality of μ-law linear equivalent values.

18. The method of claim 1 wherein said difference values comprise a plurality of A-law linear equivalent values.

19. The method of claim 1 wherein said at least one parameter comprises a normalized sum of a plurality of μ-law overflows and a plurality of A-law overflows of said at plurality of words of said voice data stream.

20. The method of claim 1 wherein said at least one parameter comprises a normalized sum of a plurality of μ-law zeros and a plurality of A-law zeros of said plurality of words of said voice data stream.

21. The method of claim 1 wherein said at least one parameter comprises a normalized difference of a plurality of μ-law overflows and a plurality of A-law overflows of said plurality of words of said voice data stream.

22. The method of claim 1 wherein said at least one parameter comprises a normalized difference of a plurality of μ-law zeros and a plurality of A-law zeros of said plurality of words of said voice data stream.

23. The method of claim 1 further comprising performing at least one test, each of said at least one test comprising at least one condition using said at least one parameter.

24. The method of claim 23 wherein said at least one condition of said at least one test comprises:

determining, using the at least one processor, if a first condition is true, said first condition assessing if a μ-law maximum jump discontinuity is greater than a first threshold;

determining, using the at least one processor, if a second condition is true, said second condition assessing if an A-law maximum jump discontinuity is greater than said first threshold;

determining, using the at least one processor, if a third condition is true, said third condition assessing if a first difference between said μ-law maximum jump discontinuity and a linear maximum jump discontinuity is greater than a second threshold;

determining, using the at least one processor, if a fourth condition is true, said fourth condition assessing if a second difference between said A-law maximum jump discontinuity and said linear maximum jump discontinuity is greater than said second threshold;

determining, using the at least one processor, if a fifth condition is true, said fifth condition assessing if a normalized sum of a plurality of μ-law overflows and a plurality of A-law overflows is above a third threshold;

determining, using the at least one processor, if a sixth condition is true, said sixth condition assessing if a linear overflows percentage is less than a fourth threshold;

determining, using the at least one processor, if a seventh condition is true, said seventh condition assessing if a μ-law overflows percentage is greater than a fifth threshold;

determining, using the at least one processor, if an eighth condition is true, said eighth condition assessing if an A-law overflows percentage is greater than said fifth threshold; and generating, using the at least one processor, a linear G.711 decision if said first through eighth conditions are all true.

25. The method of claim 23 wherein said at least one condition of said at least one test comprises:

determining, using the at least one processor, if a first condition is true, said first condition assessing if a linear zeros percentage is above a threshold;

determining, using the at least one processor, if a second condition is true, said first condition assessing if a percentage of μ-law zeros is below said threshold;

determining, using the at least one processor, if a third condition is true, said first condition assessing if an A-law zeros percentage is below said threshold; and generating, using the at least one processor, a linear G.711 decision if said first condition and said second condition and said third condition are all true.

26. The method of claim 23 wherein said at least one condition of said at least one test comprises:

determining, using the at least one processor, if a first condition is true, said first condition assessing if a first normalized difference between a plurality of μ-law overflows and a plurality of A-law overflows is greater than a normalized overflows difference threshold;

determining, using the at least one processor, if a second condition is true, said second condition assessing if a second normalized difference between a plurality of μ-law zeros and a plurality of A-law zeros is greater than said normalized zeros difference threshold;

determining, using the at least one processor, if a third condition is true, said third condition assessing if the μ-law overflows is greater in quantity than the A-law overflows;

determining, using the at least one processor, if a fourth condition is true, said fourth condition assessing if an A-law zero percentage is greater than a μ-law zero percentage;

generating, using the at least one processor, an A-law decision if said first condition and said second condition and said third condition and said fourth condition are all true;

determining, using the at least one processor, if a fifth condition is true, said fifth condition assessing if said A-law overflows are greater in quantity than said μ-law overflows;

determining, using the at least one processor, if a sixth condition is true, said sixth condition assessing if said μ-law zero percentage is greater than said A-law zero percentage; and generating, using the at least one processor, a μ-law decision if said first condition and said second condition and said fifth condition and said sixth condition are all true.

27. The method of claim 23 wherein said at least one condition of said at least one test comprises:

determining, using the at least one processor, if a first condition is true, said first condition assessing if there is not a μ-law overflow;

determining, using the at least one processor, if a second condition is true, said second condition assessing if there is not an A-law overflow;

determining, using the at least one processor, if a third condition is true if said first condition and said second condition are true, said third condition assessing if an A-law zeros percentage is greater than a μ-law zeros percentage;

generating, using the at least one processor, an A-law decision if said third condition is true;

determining, using the at least one processor, if a fourth condition is true if said first condition and said second condition are true, said fourth condition assessing if said μ-law zeros percentage is greater than said A-law zeros percentage;

generating, using the at least one processor, a μ-law decision if said fourth condition is true; and generating, using the at least one processor, an unknown decision if both said third condition and said fourth condition are not true.

28. The method of claim 23 wherein said at least one condition of said at least one test comprises:

determining, using the at least one processor, if a first condition is true, said first condition assessing if a first normalized sum of a plurality of μ-law zeros and a plurality of A-law zeros is greater than a first threshold;

determining, using the at least one processor, if a second condition is true, said second condition assessing if a first normalized difference of a plurality of A-law zeros and a plurality of μ-law zeros is greater than a second threshold;

determining, using the at least one processor, if a third condition is true if said first condition and said second condition are true, said third condition assessing if a second normalized sum of a plurality of μ-law overflows and a plurality of A-law overflows is less than a third threshold;

determining, using the at least one processor, if a fourth condition is true if said first condition and said second condition are true, said fourth condition assessing if a second normalized difference between the μ-law overflows and the A-law overflows is less than a fourth threshold;

determining, using the at least one processor, if a fifth condition is true if said third condition and said fourth condition are true, said fifth condition assessing if an A-law zeros percentage is greater than a μ-law zeros percentage;

generating, using the at least one processor, an A-law decision if said fifth condition is true;

determining, using the at least one processor, if a sixth condition is true if said third condition and said fourth condition are true, said sixth condition assessing if said μ-law zeros percentage is greater than said A-law zeros percentage;

generating, using the at least one processor, a μ-law decision if said sixth condition is true; and generating, using the at least one processor, an unknown decision if both said fifth condition and said sixth condition are not true.

29. The method of claim 23 wherein said at least one condition of said at least one test comprises:

determining if a first condition is true, said first condition assessing if a first normalized sum of a plurality of μ-law overflows and a plurality of A-law overflows is greater than a first threshold;

determining, using the at least one processor, if a second condition is true, said second condition assessing if a first normalized difference of the μ-law overflows and A-law overflows is greater than a second threshold;

determining, using the at least one processor, if a third condition is true if said first condition and said second condition are true, said third condition assessing if a second normalized difference of a plurality of μ-law zeros and a plurality of A-law zeros is less than a third threshold;

determining if a fourth condition is true if said third condition is true, said fourth condition assessing if an A-law overflows percentage is greater than a μ-law overflows percentage;

generating, using the at least one processor, a μ-law decision if said fourth condition is true;

determining, using the at least one processor, if a fifth condition is true if said third condition is true, said fifth condition assessing if said μ-law overflows percentage is greater than said A-law overflows percentage;

generating, using the at least one processor, an A-law decision if said fifth condition is true; and generating, using the at least one processor, an unknown decision if both said fourth condition and said fifth condition are not true.

30. The method of claim 23 wherein said at least one condition of said at least one test comprises:

determining, using the at least one processor, if a first condition is true, said first condition assessing if a normalized sum of a plurality of μ-law zeros and a plurality of A-law zeros is greater than a first threshold;

determining, using the at least one processor, if a second condition is true, said second condition assessing if a normalized difference of said μ-law and said A-law zeros is greater than a second threshold;

determining, using the at least one processor, if a third condition is true if said first condition and said second condition are true, said third condition assessing if an A-law zeros percentage is greater than a μ-law zeros percentage;

generating, using the at least one processor, an A-law decision if said third condition is true;

determining, using the at least one processor, if a fourth condition is true if said first condition and said second condition are true, said fourth condition assessing if said μ-law zeros percentage is greater than said A-law zeros percentage;

generating, using the at least one processor, a μ-law decision if said fourth condition is true; and generating, using the at least one processor, an unknown decision if both said third condition and said fourth condition are not true.

31. The method of claim 23 wherein said at least one condition of said at least one test comprises:

determining, using the at least one processor, if a first condition is true, said first condition assessing if a normalized sum of a plurality of μ-law overflows and a plurality of A-law overflows is greater than a first threshold;

determining, using the at least one processor, if a second condition is true, said second condition assessing if a normalized difference of said μ-law overflows and said A-law overflows is greater than a second threshold;

determining, using the at least one processor, if a third condition is true if said first condition and said second condition are true, said third condition assessing if an A-law overflows percentage is greater than a μ-law overflows percentage;

generating, using the at least one processor, a μ-law decision if said third condition is true;

determining, using the at least one processor, if a fourth condition is true if said first condition and said second condition are true, said fourth condition assessing if said μ-law overflows percentage is greater than said A-law overflows percentage;

generating, using the at least one processor, an A-law decision if said fourth condition is true; and generating, using the at least one processor, an unknown decision if both said third and said fourth conditions are not true.

32. The method of claim 23 wherein said at least one condition of said at least one test comprises:

determining, using the at least one processor, if a first condition is true, said first condition assessing if an A-law maximum discontinuity jump is greater than a first threshold;

determining, using the at least one processor, if a second condition is true, said second condition assessing if an absolute value of a difference between the A-law maximum discontinuity jump and a μ-law maximum discontinuity jump is greater than a second threshold;

generating, using the at least one processor, a μ-law decision if said first condition and said second condition are true;

determining, using the at least one processor, if a third condition is true, said third condition assessing if the μ-law maximum discontinuity jump is greater than said first threshold;

determining, using the at least one processor, if a fourth condition is true, said fourth condition assessing if the absolute value of the difference between the A-law maximum discontinuity jump and the μ-law maximum discontinuity jump is greater than said second threshold; and generating, using the at least one processor, an A-law decision if said third condition and said fourth condition are true.

33. The method of claim 23 wherein said at least one condition of said at least one test comprises:

determining, using the at least one processor, if a first condition is true, said first condition assessing if a first normalized difference between a plurality of μ-law overflows and a plurality of A-law overflows is greater than two times a second normalized difference between a plurality of μ-law zeros and a plurality of A-law zeros;

determining, using the at least one processor, if a second condition is true, said second condition assessing if a third normalized difference between said μ-law overflows and said A-law overflows is greater than a first threshold;

determining, using the at least one processor, if a third condition is true if said first condition and said second condition are true, said third condition assessing if an A-law overflows percentage is greater than a μ-law overflows percentage;

generating, using the at least one processor, a μ-law decision if said third condition is true;

determining, using the at least one processor, if a fourth condition is true if said first condition and said second condition are true, said fourth condition assessing if said μ-law overflows percentage is greater than said A-law overflows percentage;

generating, using the at least one processor, an A-law decision if said fourth condition is true;

generating, using the at least one processor, an unknown decision if both said third and said fourth conditions are not true;

determining, using the at least one processor, if a fifth condition is true, said fifth condition assessing if a normalized difference between said μ-law zeros and said A-law zeros is greater than two times a fourth normalized difference between said μ-law overflows and said A-law overflows;

determining, using the at least one processor, if a sixth condition is true, said sixth condition assessing if a fifth normalized difference between said μ-law zeros and said A-law zeros is greater than a second threshold;

determining, using the at least one processor, if a seventh condition is true if said fifth condition and said sixth condition are true, said seventh condition assessing if an A-law zeros percentage is greater than a μ-law zeros percentage;

generating, using the at least one processor, an A-law decision if said seventh condition is true;

determining, using the at least one processor, if an eighth condition is true if said fifth condition and said sixth condition are true, said eighth condition assessing if said μ-law zeros percentage is greater than said A-law zeros percentage;

generating, using the at least one processor, a μ-law decision if said eighth condition is true; and generating, using the at least one processor, an unknown decision if both said seventh condition and said eighth condition are not true.

34. A system for detecting a type of encoding applied to a voice data stream comprising:

a processor; and a storage device comprising a set of computer instructions, said set of computer instructions, when executed by said processor, generate an identification of said type of encoding used in generating said voice data stream, said identification based on generating a histogram using a plurality of words of said voice data stream, said histogram representing a quantity of said plurality of words that represent a value that is within a value range, wherein said histogram is used to determine at least one of a linear zeros quantity, a linear overflows quantity, a μ-law zeros quantity, a μ-law overflows quantity, an A-law zeros quantity, or an A-law overflows quantity.

35. The system of claim 34 wherein said storage device comprises one of a hard drive, an external memory with respect to the processor, or an internal memory with respect to the processor.

36. The system of claim 34 further comprising a media reader capable of reading a media containing a voice data stream file and capable of transmitting said voice data stream in said voice data stream file to said storage device.

37. The system of claim 34 further comprising a network interface for receiving a voice data stream.

38. The system of claim 34 further comprising a user interface for executing said set of computer instructions.

39. The system of claim 34 wherein said identifying is further based on determining a maximum value of a plurality of difference values calculated between a plurality of successive words of said plurality of words of said voice data stream.

40. The system of claim 34 wherein said identifying is further based on determining a maximum value of a plurality of difference values calculated between a plurality of successive μ-law linear equivalents of said plurality of words of said voice data stream.

41. The system of claim 34 wherein said identifying is further based on determining a maximum value of a plurality of difference values calculated between a plurality of successive A-law linear equivalents of said plurality of words of said voice data stream.

* * * * *